United States Patent [19]
Tresslar

[11] Patent Number: 5,395,126
[45] Date of Patent: Mar. 7, 1995

[54] BRAIDED TUBULAR GASKET WITH INTEGRAL ATTACHMENT MEANS

[75] Inventor: Marie C. Tresslar, Jeffersonvile, Pa.

[73] Assignee: The Bentley-Harris Manufacturing Company, Lionville, Pa.

[21] Appl. No.: 42,989

[22] Filed: Apr. 5, 1993

[51] Int. Cl.⁶ .......................... F16J 15/02; E06B 7/16
[52] U.S. Cl. ................................. 277/166; 277/181; 277/189; 277/230; 49/493.1; 49/498.1; 87/9
[58] Field of Search ............... 277/166, 181, 189, 226, 277/230, 235 R; 49/492.1, 493.1, 498.1; 87/9

[56] References Cited

U.S. PATENT DOCUMENTS

| | | |
|---|---|---|
| 2,219,962 | 10/1940 | Reynolds et al. |
| 3,578,764 | 5/1971 | Nunnally. |
| 3,812,316 | 5/1974 | Milburn. |
| 3,846,608 | 11/1974 | Valles. |
| 4,122,323 | 10/1978 | Staats. |
| 4,705,722 | 11/1987 | Ueda et al. ................. 277/230 X |
| 4,822,060 | 4/1989 | Moyer et al. ................. 277/166 |
| 5,082,297 | 1/1992 | Flasher .................... 277/230 |

FOREIGN PATENT DOCUMENTS

| | | |
|---|---|---|
| 502579 | 9/1992 | European Pat. Off. ..... F24C 15/02 |
| 2389811 | 5/1977 | France. |
| 2491120 | 4/1982 | France. |
| 9112446 | 8/1991 | Japan ...................... 277/230 |
| 154859 | 12/1920 | United Kingdom ........... 277/230 |
| 792194 | 3/1958 | United Kingdom ........... 49/498.1 |
| 926267 | 4/1992 | WIPO .................. E06B 7/16 |

Primary Examiner—William A. Cuchlinski, Jr.
Assistant Examiner—Scott W. Cummings
Attorney, Agent, or Firm—Synnestvedt & Lechner

[57] ABSTRACT

Gaskets suitable for high temperature use and having applicability for sealing oven doors are provided. The gaskets are interbraided from a wire such as stainless steel and a thermally insulating yarn formed, for example, from spun glass fibers. Continuous wireforms having spaced apart protrusions are retained in place within the openings formed by the wires and provide for attachment of the gaskets to apertures in a surface. The gaskets are manufactured on a circular braider with approximately ⅓ of the carriers being loaded with wires and ⅔ of the carriers being loaded with glass fiber yarn. The gaskets are characterized by an absence of an inner resilient support structure. Gaskets of the so called "tadpole" type comprised of interbraided glass fiber yarn and wire are also disclosed.

8 Claims, 2 Drawing Sheets

BRAIDED TUBULAR GASKET WITH INTEGRAL ATTACHMENT MEANS

FIELD OF THE INVENTION

This invention relates to tubular gaskets and the means for attachment thereof to one surface which is relatively moveable with respect to a second surface. The gaskets of this invention are braided of wire and a thermally insulating yarn and are intended for high temperature applications, such as oven door seals.

BACKGROUND OF THE INVENTION

Woven tubular gaskets have been used as oven door seals for many years. These gaskets are typically made from a combination of an inner tubular support member formed of knitted wire and an outer tubular member made either by braiding, knitting or weaving from an insulating material such as glass fiber yarn. Such structures have proven to be durable at the high temperatures used in self-cleaning ovens and provide a good seal despite repeated openings and closures of the oven door over many years Of use. An inner tubular member, sometimes called a bulb, provides the necessary resilient support of the glass fiber tubular gasket. Various methods of attaching the knitted wire and tubular gasket to ovens or oven doors have typically comprised providing a retaining member which extends along the gasket and locking the retaining member between sheet metal pieces of the oven door or by providing clamps at spaced locations around the periphery of the gasket. Examples of such oven gaskets and their attachment are shown in U.S. Pat. Nos. 2,219,962 to Reynolds et al; 3,578,764 to Nunnally et al; 3,812,316 to Milburn; 3,846,608 to Valles; and 4,122,323 to Stats.

An alternative form of gasket having attachment means comprised of a wireform having spaced attachment protrusions which fit into corresponding apertures in a surface to which the gasket is to be attached is shown in U.S. Pat. No. 4,822,060.

Although gaskets of the above patents are effective for their intended purpose, the gaskets are somewhat difficult to fabricate and, consequently, relatively expensive. A problem sometimes arises with the gaskets of the '060 patent owing to the difficulty of insertion of the wireform carrying the protrusions through the knitted tubular wire bulb and then in the passage of the protrusions through the bulb and the overlayer of braided gasket material. Not only does the insertion of the wireform tend to be difficult to accomplish, the passage of the protrusions through the exterior gasket layer often tears the individual strands of glass fiber resulting in an undesirably high scrap rate.

SUMMARY OF THE INVENTION

According to the present invention, a gasket comprised of glass fiber yarn or yarn of other suitable thermally insulating fiber and flexible and resilient wire is formed by braiding together the wire and the yarn to form a flexible resilient tube having a unitary cylindrical wall layer witch a hollow interior free of any supporting bulb. The wire in the braid forms an open, integral support matrix for the yarn with the yarn held in place by the support matrix and substantially filling the spaces between the wires. Attachment means which is preferably a flexible wireform having spaced protrusions is inserted within the braided tube. The protrusions are fitted through the openings established by the matrix and pass between the individual strands of the yarn. Because the yarn tends to be held loosely in place by the matrix, there is relatively little tendency to tear the individual yarn strands when the protrusions are passed therethrough. The absence of the interior support bulb not only eliminates a step in the manufacturing process but facilitates the passage of the wireform through the side wall of the hollow gasket. In addition, it has been found that much less wire is required in the structure for a given degree of resilience as compare with gaskets employing knitted wire bulbs as an interior support.

The invention also comprises a method for forming an insulating gasket of the type used for providing an insulating seal for an oven door or like assembly. In carrying out the method, flexible and resilient wire and insulating yarn of flexible strand are interbraided to form a gasket having a hollow core which is free from supporting sub-structure. The resilient and flexible wire forms a support matrix within the layer of interbraided yarn. The invention further provides for the insertion of a flexible metal wireform having spaced protrusions extended lengthwise thereof, the wireform being inserted into the hollow core following which the protrusions are passed through the openings in the matrix and the yarn which is locked within the matrix openings.

Objects and advantage of the invention include the elimination of the inner knitted wire support bulb and the labor involved in its insertion, the simplification of the gasket which allows for ready insertion of the wireform into the gasket and the locking of the protrusions relative to the gasket within the matrix openings formed by the crossing wires within the braid. The amount of wire required for a gasket of given size and resilience is substantially reduced.

A further object of the invention is a reduction in scrap rate of the gaskets during the production process.

Because of the braided construction, the gasket of the invention lends itself readily to axial compression allowing for some accommodation for minor variations in the spacing of the apertures in the supporting surface as occurs from time to time.

The invention also has applicability to the manufacture of gaskets of the so called "tadpole" type as disclosed and claimed in U.S. Pat. No. 3,578,764. According to the invention, gaskets having the same general outer appearance as the gaskets of the '764 patent can be prepared while eliminating the inner supporting wire layers and without the necessity for installation of a paper core as is contemplated in that patent. In accordance with the present invention, a gasket is formed of wire and insulating yarn interbraided to form a unitary member which serves the purpose of the gasket and the retaining member of the '764 patent. Preferably, the gasket and the retaining member are separated by a planar section which is stitched to maintain the separation by stitching at one or more spaced locations using the insulating yarn as in the '764 patent.

Gaskets fabricated as aforementioned function effectively and are much simpler to manufacture due to elimination of inner support bulbs. In addition, the amount of wire required to maintain gasket resilience is substantially reduced.

DETAILED DESCRIPTION OF THE PREFERRED EMBODIMENT OF THE INVENTION

Figure 1:
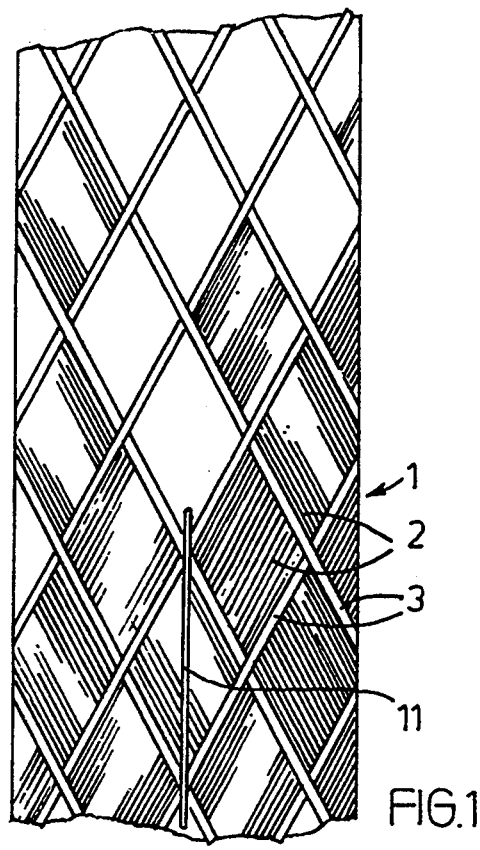
FIG. 1 is a schematic view of a section of a tubular gasket incorporating the principles of the present invention.

As illustrated in FIG. 1, a preferred form of a gasket incorporating the principles of the invention comprises a thermally insulating material in multifilament form, such as spun glass fiber yarn or yarns of ceramic, quartz or related materials characterized by low thermal conductivity. For applications such as the insulation of oven doors, a preferred material is glass fiber because of its low cost and excellent thermal insulating properties. In addition, the glass yarn is relatively flexible and is resistant to degradation at the relatively high temperatures existing during the cleaning cycle of high temperature ovens.

In accordance with the preferred embodiment of the invention, the tubular gasket 1 is a braided structure utilizing glass fiber yarn 2 which is braided together with single filament wire 3. Preferably, the wire employed is stainless steel wire, although other metallic wire formed from stainless steel, black iron, inconel, copper or the like may be employed, so long as these materials are flexible and resilient enough to allow for repeated compression and will return to original shape over the lifetime of an oven.

Figure 2:
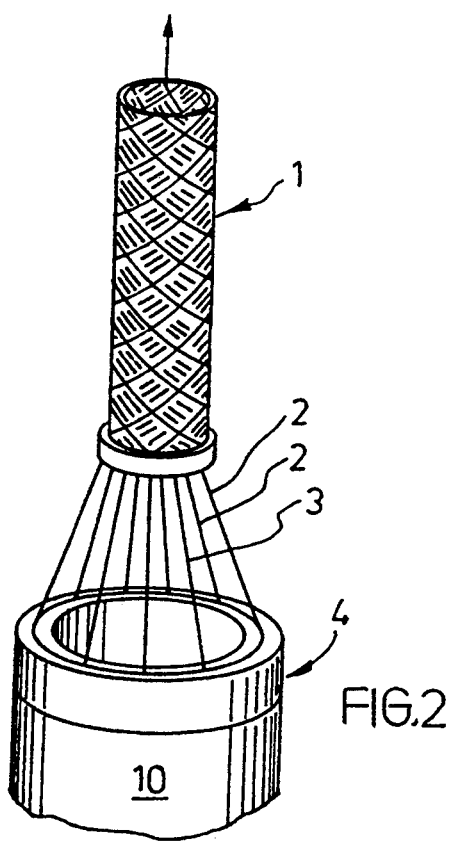
FIG. 2 is a schematic representation of a braider used in manufacturing tubular gaskets of the type shown in FIG. 1.

In carrying out the invention, the wire and glass fiber yarn are interbraided on a circular braider 4, as illustrated schematically in FIG. 2. Preferably, the yarn 2 and wire 3 are loaded on separate carriers on the braider, there being preferably 24 carriers of wire and 48 carriers of glass fiber yarn in a 72 carriers circular braider. Variations in proportions may be employed, a preferred range being from about 25% wire to about 75% yarn up to about 50% wire to about 50% yarn. Preferably, the yarn employed is a continuous multifilament yarn of E glass, such as type E37½ as supplied by Owens Corning Fiberglass Company. Stainless steel wire having a diameter of 6 mils is employed, although the diameter of the wire may range from about 3 to about 15 mils without departing from the scope of the present invention.

Figure 3:
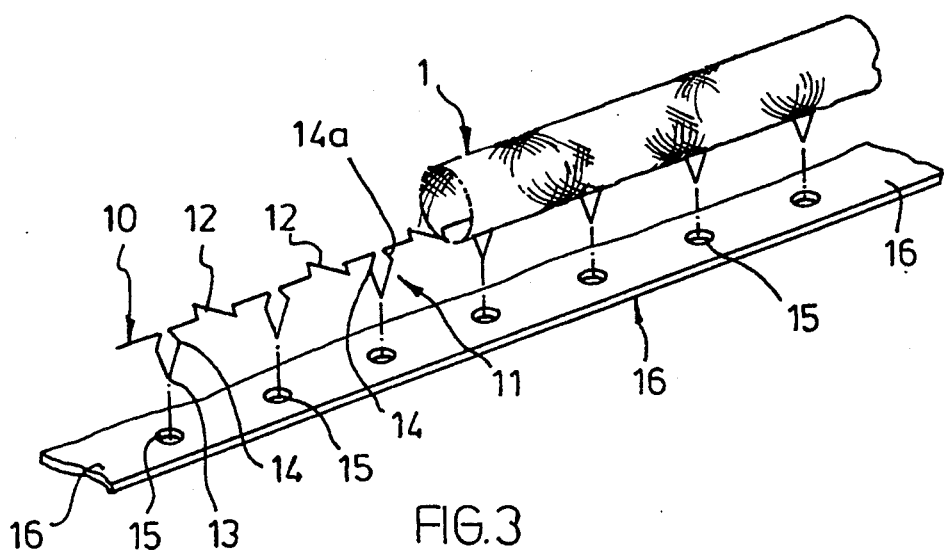
FIG. 3 is a broken away schematic representation of the gasket of FIG. 1.
Figure 4:
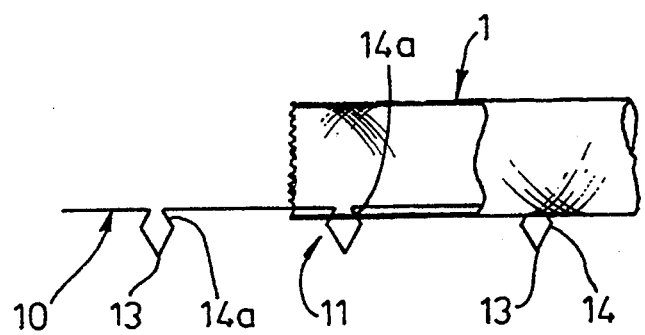
FIG. 4 is a side view of the gasket of FIGS. 1 and 3.
Figure 5:
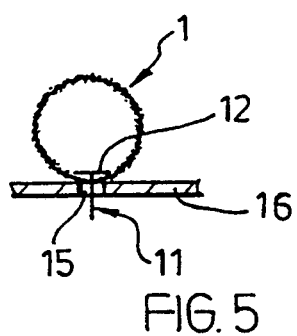
FIG. 5 is an end view of the gasket of FIGS. 1, 3 and 4 illustrating the gasket in position between first and second surfaces.

In the embodiment of the invention illustrated in FIGS. 1 through 5, attachment means for the gasket preferably comprises a wireform 10 having spaced apart protrusions 11 which are separated by laterally projecting zigzag portions 12 in a manner similar to the wireforms disclosed in U.S. Pat. No. 4,822,060. As illustrated in FIGS. 3 and 4, the protrusions all preferably lie in a common plane and are spaced to coincide with the spacing of openings in one of the two surfaces on which the gasket is located.

As shown in FIG. 3, the spaced protrusions 11 each has a generally pointed apex 13 and pairs of shoulders 14 and a relatively narrow neck portion 14a. Each of the protrusions 11 lies in a common plane so that all of the protrusions project radially outwardly from the gasket for ease of insertion into correspondingly spaced apertures 15 within a plate 16 which forms one of the two surfaces between which the gasket is intended to function as a seal. The zigzag portions 12 serve as stabilizing platforms which aid in maintaining the protrusions in the radially extending position in order to facilitate their insertion into the apertures 15.

Preferably, the wireform 10 is inserted as a separate step into a preformed gasket. The protrusions 11 are then passed through the matrix openings established by the wire 3 and the relatively loosely supported strands of yarn. Once the protrusions have been passed, the resilient wires of the braid tend to close together holding the protrusions 11 in place. It has been observed that installation of the wireform is more readily accomplished and the scrap rate is reduced substantially as compared with gaskets having wireforms and interior support bulbs. The gaskets have comparable resilience to those formed with interior support bulbs.

Figure 6:
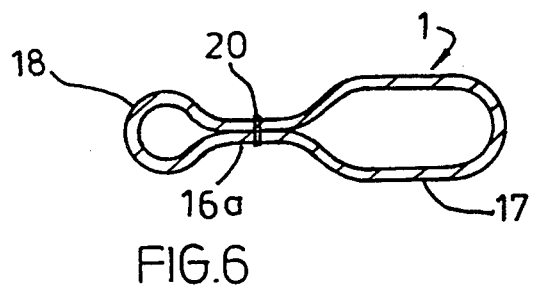
FIG. 6 is a sectional view of another embodiment of a gasket incorporating principles of the invention.

As indicated above, the invention also has applicability to the so called "tadpole" type gaskets of a type similar to those disclosed in U.S. Pat. No. 3,578,764. In the construction of such gaskets, a braided sheath is formed by braiding a yarn having a high insulation value as aforementioned with wire in the proportions indicated above. Rather than provide interior supports as in the '764 patent, the tubular sheath 16 is pressed together as shown in FIG. 6 at 16a intermediate the gasket portion 17 and the retaining portion 18. The pressed together portion is secured by stitching or by other means, as indicated at 20, one or two lines extending lengthwise of the gasket and the retaining member. As in the first embodiment of the invention, substantially less wire is required and simplification of the manufacturing process is achieved as compared with the prior art gaskets of this type.

What is claimed is:

1. A tubular gasket for thermally sealing a space between a first surface and a second surface, wherein one of said surfaces has a series of spaced apertures, said gasket comprising:
    (a) an insulating yarn of flexible strand selected from the group consisting of ceramic, quartz and glass and mixtures thereof;
    (b) flexible and resilient metal wire;
    (c) said wire and said yarn being interbraided to form a flexible tube having a unitary cylindrical wall layer with a hollow interior, the wire forming an open support matrix for the yarn and the yarn substantially filling the spaces between the wires of the open support matrix, the ratio of the yarn to the wire in said unitary cylindrical wall layer being from about 1:1 to 3:1; and
    (d) a flexible metal wire form fitted within said tubular gasket and having protrusions spaced lengthwise thereof, said protrusions being spaced along the wire in accordance with the spacing of said apertures in said one of said surfaces, said protrusions extending through the openings of said open support matrix and the strand material and being adapted to pass through the apertures in said one surface, the openings in said wire support matrix comprising means to retain the tubular gasket in fixed position relative to said one of said surfaces.

2. A tubular gasket according to claim 1, wherein the openings in said support matrix comprise means for holding the protrusions in fixed position relative to said insulating yarn.

3. A tubular gasket according to claim 2 wherein said protrusions each have a relatively narrow neck portion and a pair of shoulder portions which are wider than said neck portion, said neck and shoulder portions lying in a plane substantially perpendicular to the long axis of said gasket, said matrix openings being diminished to interengage with the neck portion to hold the protrusions in a fixed position relatively to the insulating yarn and said shoulder portions being adapted to be retained within said apertures.

4. A tubular gasket for thermally sealing a space between a first surface and a second surface, wherein one of said surfaces has a series of spaced apertures, said tubular gasket comprising:
- (a) an insulating yarn of flexible strand selected from the group consisting of ceramic, quartz and glass and mixture thereof;
- (b) flexible and resilient wire;
- (c) said wire and said yarn being interbraided to form a flexible tube having a unitary tubular wall with a hollow interior free of any supporting substructure, said wire forming an open lattice support matrix for the yarn with the crossing wires being free for relative movement toward and away from one another, the insulating yarn substantially filling the spaces between the wires of the open lattice support matrix;
- (d) the ratio of yarn to wire in said unitary tubular wall being from about 1:1 to 3:1.

5. A tubular gasket according to claim 4, further including a flexible metal wire form fitted within said tubular gasket and having protrusions spaced lengthwise thereof, said protrusions being spaced along the wire in accordance with the spacing of said apertures in said one of said surfaces, said protrusions extending through the openings of said open support matrix and the strand material and being adapted to pass through the apertures in said one surface, the openings in said wire support matrix comprising means to yieldably retain the tubular gasket in fixed position relative to said one of said surfaces.

6. A tubular gasket according to claim 4, wherein said gasket further comprises a hollow tubular mounting element formed integrally with said first named flexible tube, said mounting element extending lengthwise of the gasket a spaced distance therefrom, said element being formed as a continuation of the yarn and wire interbraided wall layer, said wall layer comprising a continuous sheath forming the gasket, a planar spacer part intermediate the gasket and the mounting element.

7. A tubular gasket according to claim 6, further including at least one row of glass fiber stitching extended along the planar spacer for joining the layers of said space together.

8. A method of making a tubular gasket comprising;
- interbraiding multifilament yarn and flexible and resilient wire to form a tube having a wall comprised of an insulating yarn within a flexible and resilient wire matrix, the wires being free for relative movement with respect to one another;
- inserting into said tube a wireform having a plurality of protrusions, each having a relatively narrow neck portion and a pair of shoulder portions which are wider than said neck portion, each lying with the others in a common plane;
- pressing the protrusions through the openings formed between the wires of the matrix and through the multifilament yarns within the matrix openings; and
- interengaging the relatively narrow neck portion with the wires of the matrix to yieldably maintain said protrusions in positions projecting substantially radially of said gasket.

* * * * *